July 26, 1938.　　　E. L. YOUNG　　　2,124,866
LAMINATED SHIM
Filed July 23, 1935
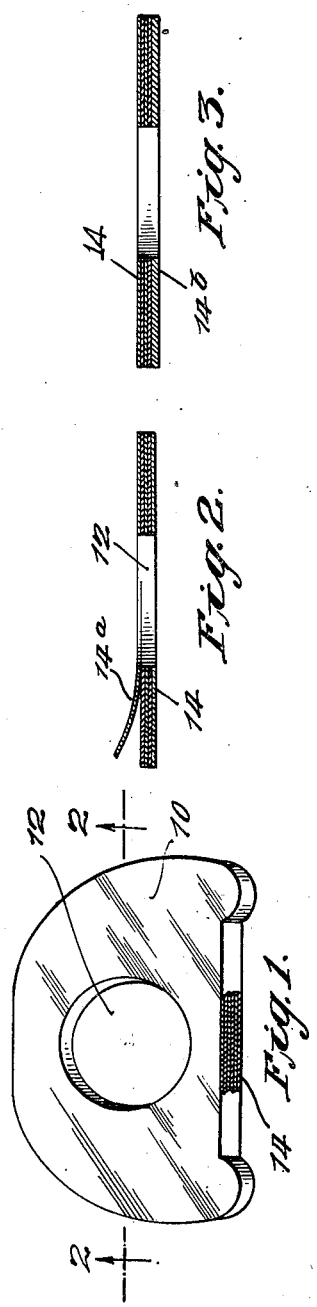
INVENTOR.
Earle L. Young
BY
ATTORNEY.

Patented July 26, 1938

2,124,866

UNITED STATES PATENT OFFICE 2,124,866

LAMINATED SHIM

Earle L. Young, Bayside, N. Y., assignor to Laminated Shim Co., Inc., Long Island City, N. Y., a corporation of New York Application July 23, 1935, Serial No. 32,724

8 Claims. (Cl. 308—244)

This invention relates to improvements in shims and more particularly to an improved steel shim of the laminated type in which the laminae may be peeled or stripped from the pack.

One of the principal objects of my invention is to provide an improved laminated shim having a plurality of steel laminae so bonded together that they will normally maintain a compact packed shape and will not curl or come loose from the pack under ordinary conditions of handling and installation and in which the laminae may be peeled or removed from the pack as desired for adjustment purposes.

Another object of my invention is to provide an improved laminated shim having steel laminae which are coated with a non-ferrous coating and bonded together with a less adhesive bonding agent which thinly and uniformly covers the laminae so that the shim pack will be of a thickness substantially equal to the multiple thickness of the respective laminae and so that the laminae will be held with an adhesive force which is less than the cohesive force of the thin laminae, but which is adequate to prevent curling or accidental separation.

Another and more specific object of my invention is to provide an improved laminated shim having thin layers or laminations bonded to each other by a bonding agent which is uniformly spread over the entire surface and subsequently partially squeezed out to firmly bind the laminations together, such bond being adequate to hold the laminations in position during forming of the shim as on a punch press whereby there is a minimum of handling of loose elements, the shim pack being initially cleaned of all bonding material in the outer surfaces so that the final shim is ready to use and will not adhere to the parts between which it is used.

A still further object of my invention is to provide a laminated shim having a plurality of copper plated steel laminae bonded together with a high lead solder.

Further objects and advantages of my invention will appear from the following description thereof taken in connection with the attached drawing, which illustrates a preferred embodiment of my invention, and in which Fig. 1 is a perspective view with parts in section of one type of my preferred form of laminated shim.

Fig. 2 is a vertical section taken substantially along the line 2—2 of Fig. 1, showing one of the laminae partially peeled from the pack.

Fig. 3 is a vertical section similar to that shown in Fig. 2 but showing a modified type of shim.

Laminated brass shims of the general type shown in Darrach Patent No. 1,933,050, granted October 31, 1933, have gone into widespread use in various mechanical fields and especially in connection with the adjustment of split bearings for automotive engines. Such shims however have been made only of brass or other copper alloys as it has been impossible heretofore to bond steel laminations together in a satisfactory manner, although to withstand greater bearing pressures and for other reasons a steel shim is superior to brass. In attempting to make steel shims, however, it has been found that a bonding agent which was adequate to prevent curling of the laminae and to hold the laminae in a pack during stamping, shipping and installation was so secure that the steel laminae could not be cleanly peeled from the pack when desired. On the other hand, shims that met the requirements of ease in application were not stable and often became so badly damaged before use that they were unusable.

I have now found that I can produce a highly satisfactory laminated steel shim by using a steel of the desired thickness which may be as low as one-thousandth of an inch, by initially plating the steel with a non-ferrous coating and then using a suitable bonding agent such as of the lead-tin series. I find that, of the non-ferrous coatings, copper applied by electrodeposit from a suitable copper salt solution, such as copper sulphate, is the best, although other materials are available. Copper bonds very well with steel, however, and copper plating will not peel from the steel and will serve as a suitable intermediate bonding agent. The steel used is preferably a hard or semi-hard cold rolled low carbon steel.

With a copper coated steel, I can use different metallic binders, but I find a high lead solder which has over 50% lead to be most suitable. This principal bonding agent holds the laminae together in a satisfactory manner and prevents curling or loosening of the laminae except by the desired peeling as with a knife when a change in size is required for adjustment purposes. Such a bonding agent, cooperating with the intermediate non-ferrous coating, has many of the characteristics of the former brass shims and with the bond less than the cohesive strength of the steel laminae, the laminae may be freely peeled from the pack to leave a smooth and clean surface.

Typical shims 10 made in accordance with my process are shown in Figures 1 to 3. As is well known practice with brass shims, the shim 10 is adapted to be placed between bearing halves which are drawn tight by bolts which may pass through suitable holes or slots 12, and such shim thereby acts as a spacer for accurate adjustment of the bearing to the shaft or rotating member. With the steel shim there is far less tendency of the shim to become reduced in thickness or squeezed out, and the bearing parts may be drawn together with a greatly increased pressure over that possible with brass shims. The steel shim will remain of substantially uniform thickness to maintain the correct diameter for the bearing and adjustments may be more accurately carried out.

The shim 10 is preferably made as a compact unit of separate laminae, as laminae of the order of two-thousandths of an inch in thickness are very delicate, and separate handling is more expensive. Furthermore, such thin laminations can be more uniformly compacted from original stock due to the absence of grease and dirt and other foreign substances which are eliminated in the manufacturing process, and I find that forming a stock of laminae from which the shim is finally cut out is most satisfactory. The size of the shim stock varies with the specific requirements but usually there are five or more laminae of two-thousandths or three-thousandths of an inch thereby forming a shim of ten or fifteen-thousandths of an inch. Many other combinations are possible as is obvious, and in some cases I find it desirable to use a rather heavy backing plate 14b as shown in Figure 3, such plate similarly being plated as are the laminae. The shim may also have a Babbit tip as shown in Darrach Patent No. 1,933,050, above referred to. In any of these forms of shim, peeling one or more laminae, such as indicated at 14a in Figure 2, will give the desired thickness for adjustment.

In a suitable method of making a preferred form of my product, a continuous strip of steel of the thickness desired for the various laminae is first passed through an electroplating bath to give the strip a flash coat of firmly adherent material, for example copper, and then through a fluxing and cleaning bath and a bath of bonding material to coat the strip with the less firmly adherent material, such as a high lead solder. The strip is wiped to remove surplus solder, coated with material which inhibits oxidation, and then severed into fixed lengths corresponding to the length of the initial shim stock. Thereafter, the lengths are stacked in accordance with the number of laminations desired in the completed shims, and several such stacks are grouped together in a pack with spacer sheets therebetween. The pack is then placed in a confining jacket, or envelope, and moved into an oven where heated to a temperature above the fusion point of the solder. It is then run through a press which presses the hot strips together uniformly and squeezes out surplus bonding material. Each stack of laminations between adjacent spacers, now a sheet of shim stock, is removed from the pack, polished on its top and bottom surfaces, and then formed into individual shims or shim stock of the desired size and shape, by any suitable cutting or forming operation.

My all steel shims having the non-ferrous coating are within a very small tolerance of a thickness which is equal to the multiple of the laminations themselves, and I am therefore able to obtain a proper and uniform size of lamination which is especially desirable for standard operations. In all probability the pressing operation expels the largest percentage of the solder so that the shims are substantially all steel. They are not compressible within the loads to which they are subjected under typical conditions and they are a far superior product in this respect. Being stamped as a whole from the laminated shim stock to the proper size they are also relatively inexpensive.

While I have shown and described a preferred form of embodiment of the shim and of the methods and apparatus for making it, I am aware that other modifications may be made to my invention within the scope and spirit thereof and I therefore desire a broad interpretation of the disclosure herein and the claims appended hereinafter.

I claim:

1. A laminated shim of the class described comprising a plurality of thin laminae of steel, each of said laminae having a non-ferrous flash coating firmly adherent thereto and a high lead solder bonding agent placed between the relative surfaces of the laminae to hold said laminae together and to permit easy separation thereof without tearing the laminae.

2. A laminated shim of the class described comprising a plurality of laminae of steel, each of said laminae having an electroplated copper coating and a non-ferrous bonding agent uniformly spread between the contiguous surfaces of the laminae to removably hold said laminae together.

3. A laminated shim of the class described comprising a plurality of steel laminae, said laminae having a firmly adherent copper plating thereon and a high lead solder bonding agent uniformly placed over the surfaces of the respective laminae to maintain a bond therebetween to prevent accidental removal of one laminae from another, such bond permitting the clean peeling of one laminae from another.

4. As an article of manufacture, a shim composed of a plurality of separably united steel sheets of the order of .002" in thickness and a steel body plate of substantially greater thickness, a bonding means on said sheets and said body plate which cannot be peeled therefrom, and a second bonding means spread uniformly over the entire adjacent surfaces of the laminae and body plate which is less adherent so that one or more laminae may be peeled from the shim.

5. A shim of the class described comprising a plurality of flat sheets of steel lying one upon the other and each joined to the next by a compound coating of a firmly adherent material and a less firmly adherent material distributed over the entire adjacent surfaces of adjacent sheets, such bonding material being of separable character to permit the reduction in thickness of said shim by the peeling of one sheet from another without tearing the sheets.

6. A laminated steel shim having a plurality of relatively thin steel laminations and a thicker body plate of steel, said laminations and body plate being plated with a material having sufficient cohesion to hold a bonding agent, and a bonding agent between each plated surface of sufficient cohesion to prevent accidental dislodgment of the laminations, and to permit clean removal of the laminations by peeling.

7. A laminated shim of the class described consisting of a plurality of steel laminae having a non-ferrous bond between the respective laminae which has a coefficient of adhesion relatively lower than the coefficient of cohesion of the steel and in which the coefficient of adhesion of the bond will hold the laminae together during the normal handling and transfer of the shim and adequate to prevent curling.

8. As a new article of manufacture, a laminated steel shim having a body portion including a plurality of thin steel laminations of the order of .002″ in thickness, said laminations having extremely thin electro-plated copper coatings on each face, and a high lead solder binding agent uniformly spread between the contiguous plated surfaces, said solder bonding agent being thicker than the copper coatings but relatively thin whereby the shim is substantially incompressible.

EARLE L. YOUNG.